UNITED STATES PATENT OFFICE.

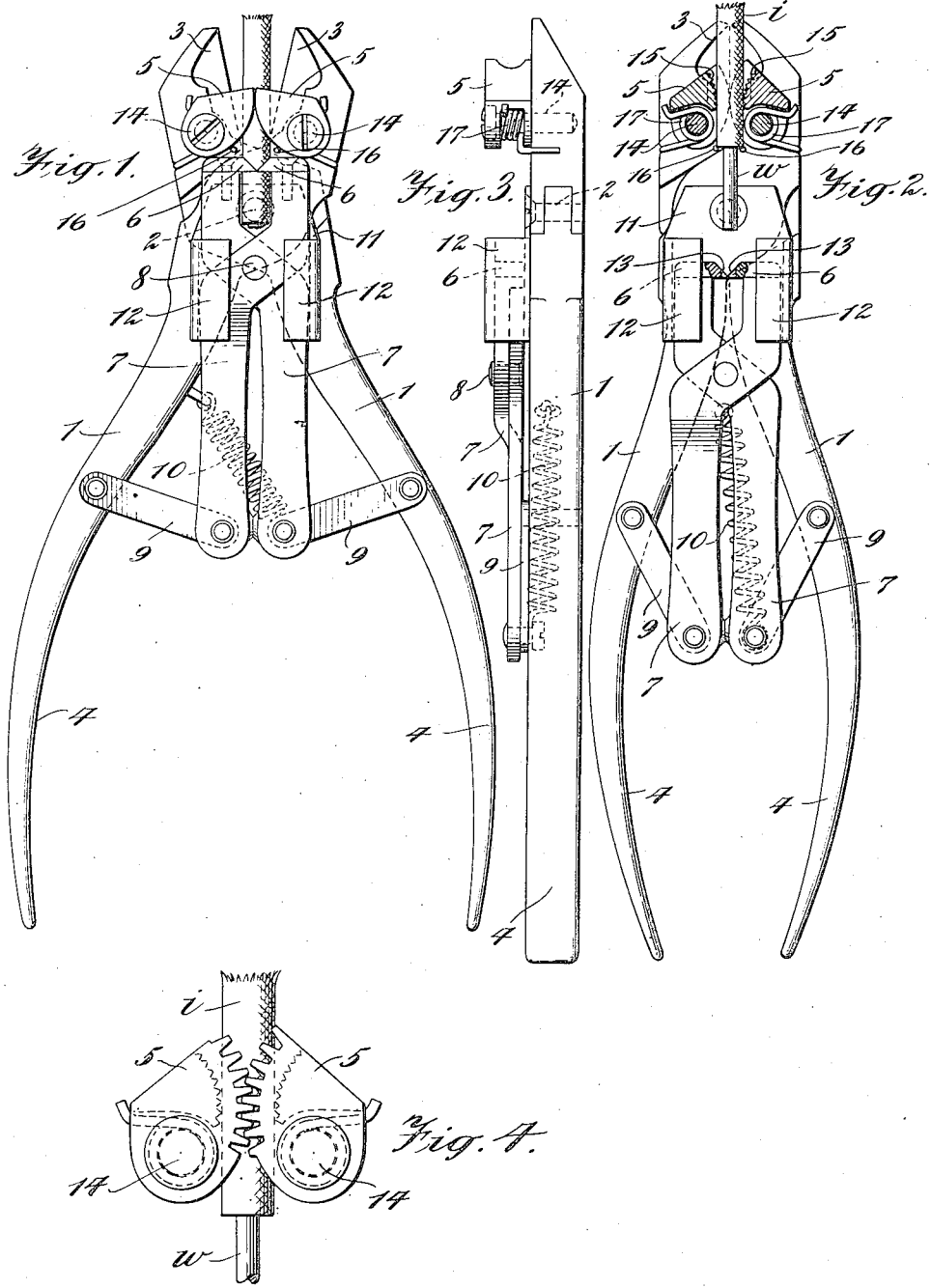

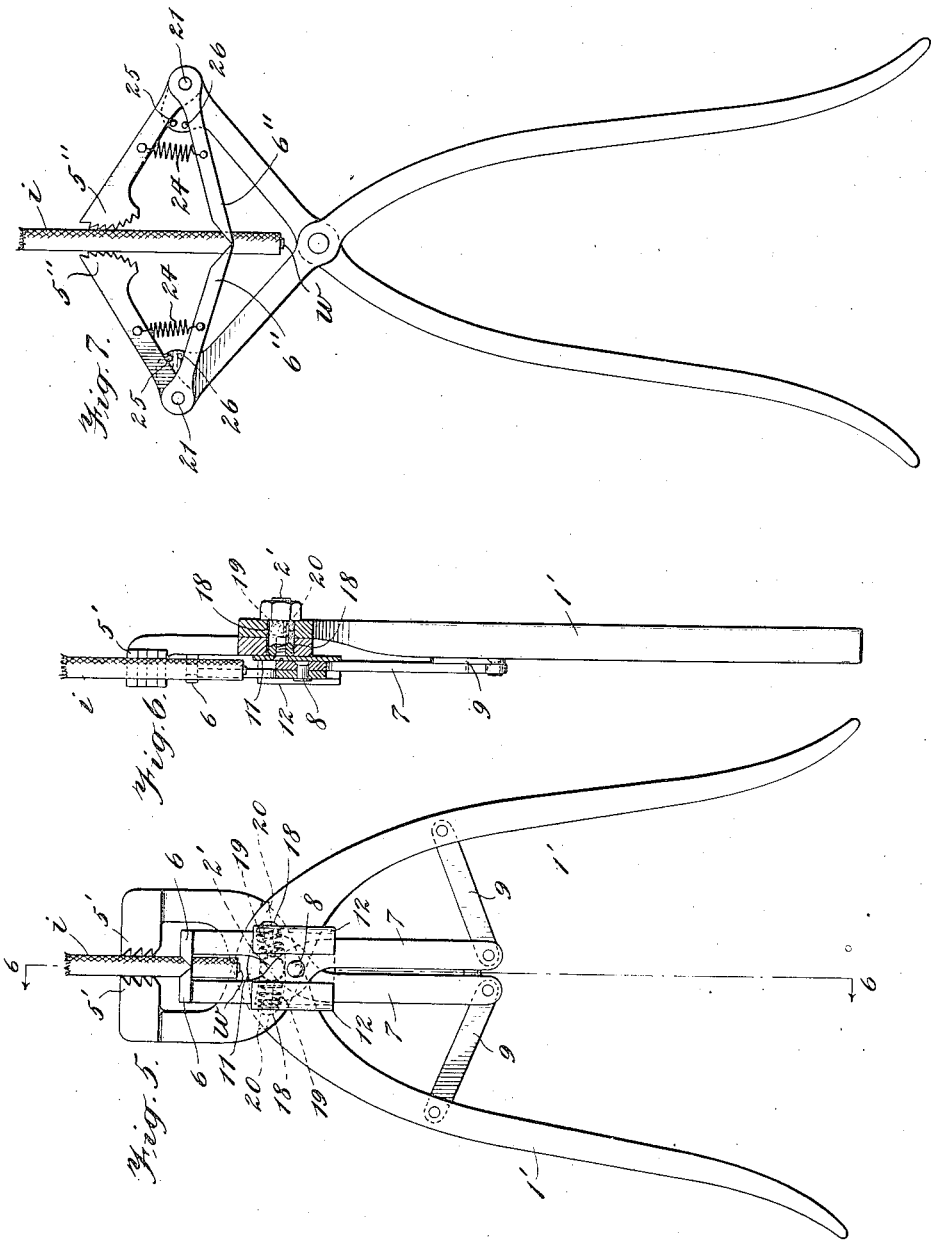

STUART G. WOOD, OF BROOKLYN, NEW YORK.

INSULATED-WIRE-STRIPPING DEVICE.

1,151,319.　　　　Specification of Letters Patent.　　Patented Aug. 24, 1915.

Application filed June 22, 1915. Serial No. 35,529.

*To all whom it may concern:*

Be it known that I, STUART G. WOOD, a citizen of the United States, and resident of the borough of Brooklyn, in the county of Kings and State of New York, have invented a certain new and useful Insulated-Wire-Stripping Device, of which the following is a specification.

My invention relates to improvements in that class of devices adapted for stripping insulation from insulated wire. In devices of this class as heretofore made, no means have been provided for holding the wire against the pull of the device during the stripping operation; it having been necessary to hold the wire with one hand—in those cases where the wire was not attached to some holding object—against the pull of the stripping device being manipulated by the other hand. This obviously impairs the efficiency of the device, particularly in those cases where the space in which the stripping operation to be effected, is limited, as, for instance, in the space between building walls.

It has therefore been the main object of my invention to provide an improved stripping device that will be operative to overcome the inefficiency referred to of the prior devices. This object I accomplish by providing a device having wire clamping means, wire stripping means, and means for causing a movement of both said means, or one relatively to the other, in a direction longitudinally of the wire whereby to effect stripping of the insulation from the wire.

Referring now to the accompanying drawings in which I have illustrated several embodiments of my invention, Figure 1 is a front elevation of a device embodying one form of my invention, the device being shown in clamping engagement with a piece of insulated wire and ready to commence the stripping operation. Fig. 2 is a similar view with certain of the parts in section, the device in this instance being shown with its parts in the position they assume at the finish of the stripping operation. Fig. 3 is an edge view of the device shown in Figs. 1 and 2. Fig. 4 is an enlarged detail showing one form of connection between the clamping jaws. Fig. 5 is a front elevation of a device embodying another form of my invention. Fig. 6 is a section taken on the line 6—6 of Fig. 5, and Fig. 7 is a front elevation of a device embodying a third form of my invention.

Similar reference characters indicate like parts in the several views.

My invention may be embodied in various forms. As shown in Figs. 1 to 3 inclusive, it is applied to a wire cutting device of ordinary construction comprising a pair of lever members 1, 1, connected together at a point between their ends by a pivot 2, the upper arms of which members are formed with a pair of cutters 3, 3, and the lower arms of which constitute operating handles 4, 4. Attached to the upper arms of this device are a pair of clamping jaws 5, 5, between which the wire to be stripped is adapted to be held. Immediately below these clamping jaws are a pair of combined cutting and stripping jaws 6, 6, carried at the upper ends of a pair of levers 7, 7, which are pivoted together at 8 and connected at their lower end with the handles 4, 4, through the medium of pivoted links 9, 9. In the operation of the device thus far described, the operating lever members 1, 1, are adapted to be opened to separate the clamping and stripping jaws sufficiently to permit of the ready insertion of the wire therebetween, after which said lever members are brought together sufficiently to first cause the clamping jaws to firmly grip the interposed wire and the cutting and stripping jaws to cut the insulation *i* of the wire, as shown in Fig. 1, after which, a continued compression of the lever members toward each other, acting through the links 9, 9, operates to impart a downward movement of the stripping jaws in a direction longitudinally of the wire and thereby effect a stripping of the insulation from said wire, as shown in Fig. 2, in which a stripped end of the wire is indicated at *w*. After the stripping of the wire has been effected in the manner described, the operating lever members 1, 1, are automatically opened and the stripping jaws returned to their normal raised position, under the action of a spring 10 which connects at one end with one of the links 9 and at its opposite end with one of the handles as shown.

As a means to hold the stripping jaws and their supporting levers 7, 7, in operative connection with the device and guide the same in their longitudinal stripping movements, I have connected a holding guide 11 with the pivot 2 of the lever members, which guide is formed at its opposite lateral edges with inwardly turned flanges 12, 12, which loosely embrace the levers 7, 7, as shown.

In order that the stripping jaws may effect a complete severance of the insulation without cutting the wire core, they are formed with oppositely located notches 13, 13, to receive the wire, as shown in Fig. 2.

In so far as the operation of the device as hereinbefore described is concerned, the clamping jaws 5, 5, may be connected with the operating lever members in any desired manner rendering them capable of performing their described function. As shown, however, said jaws are eccentrically mounted on pivots 14, 14, in a manner whereby they will operate, when forced together, to initially clamp the interposed wire, as shown in Fig. 1, and thereafter, as the lever arms are brought closer together, turn or rock upwardly as shown in Fig. 2 and thereby operate to move or pull the clamped wire in a direction away from the stripping jaws. In this way a simultaneous movement of both the clamping jaws and stripping jaws in a direction away from each other and longitudinally of the wire, is effected, whereby a correspondingly decreased movement of the respective jaws is necessary for effecting the stripping of a given length of wire.

The clamping jaws are preferably grooved and serrated for clamping engagement with the wire, as indicated at 15 in Fig. 2, and are movably held in normal position against stop pins 16 by means of springs 17, which are best shown in Fig. 2 as being mounted on the pivots 14 with one end engaging the jaw and the other end engaging the lever arm.

The clamping jaws, as shown in Figs. 1 to 3 inclusive, have no direct connection with each other, but in some instances it may be desirable to have them in operative connection, which may be effected by providing the same with intermeshing gear teeth as shown in Fig. 4, in which view the teeth are shown to be of sufficient length to permit of a limited lateral movement of the jaws relatively to each other for the purpose of permititng ready and convenient location of the wire between the jaws.

Referring now to Figs. 5 and 6, I have here shown the clamping jaws, indicated at 5', 5', as integral with the lever members 1', 1', while the cutting and stripping means remain substantially the same in construction and operation as in the preceding views. With this construction, when the parts have been brought to the positions shown in Fig. 5, with the fixed clamping jaws in clamping engagement with the wire and the stripping jaws in position ready to commence their stripping movement, it is obviously necessary that provision must be made to permit of the further compression of the lever handles for effecting actuation of the stripping jaws in a direction longitudinally of the wire. This is provided in the present instance by forming elongated transverse slots 18 in each of the lever members for their pivot 2', whereby to permit of the necessary further compression of the lower ends of the lever members. As a means to movably maintain the parts in their proper relation when these elongated slots are employed, I locate expansion springs 19, 19, in the said slots between the pivot 2' and the outer end walls of the slots and retain these springs in position by mounting the same on pins 20, 20, loosely seated in openings in the lever members.

Referring now to Fig. 7, illustrating another embodiment of my invention, both the clamping jaws, indicated at 5″, 5″, and the stripping jaws, indicated at 6″, 6″, are mounted on pivots 21, 21, at the upper extremities of the lever members, for engagement with the wire in the manner shown; the two pairs of jaws being normally maintained in proper position relative to each other and to the supporting and operating lever members, by means of springs 24 movably holding the jaws against stop pins 25 and 26 on said members as shown.

It will be obvious from the foregoing that my invention may be embodied in various more or less substantially different forms without departure from the spirit and scope of the same as defined by the following claims.

What I claim is:—

1. A wire-stripping device, comprising clamping means, stripping means, and means for effecting movement of one of said means relatively to the other in a direction longitudinally of the wire.

2. A wire-stripping device, comprising clamping means, combined cutting and stripping means, and means for effecting movement of one of said means relatively to the other in a direction longitudinally of the wire.

3. A wire-stripping device, comprising clamping means, stripping means, and means for effecting simultaneous movement of both said means in a direction away from each other and longitudinally of the wire.

4. A wire-stripping device, comprising clamping means, combined cutting and stripping means, and means for effecting simultaneous movement of both said means in a direction away from each other and longitudinally of the wire.

5. A wire-stripping device, comprising a pair of clamping jaws, a pair of stripping jaws, and means for effecting movement of one pair of jaws relatively to the other in a direction longitudinally of the wire.

6. A wire-stripping device, comprising a pair of clamping jaws, a pair of combined cutting and stripping jaws, and means for effecting movement of one pair of jaws relatively to the other in a direction longitudinally of the wire.

7. A wire-stripping device, comprising a pair of clamping jaws, a pair of stripping jaws, and means for effecting simultaneous movement of both pairs of jaws in a direction away from each other and longitudinally of the wire.

8. A wire-stripping device, comprising a pair of clamping jaws, a pair of combined cutting and stripping jaws, and means for effecting simultaneous movement of both said pairs of jaws in a direction away from each other and longitudinally of the wire.

9. A wire-stripping device, comprising a pair of pivoted clamping jaws, a pair of stripping jaws, and means for effecting movement of one of said pairs of jaws relatively to the other in a direction longitudinally of the wire.

10. A wire-stripping device, comprising a pair of pivoted clamping jaws, a pair of combined cutting and stripping jaws, and means for effecting simultaneous movement of both said pairs of jaws in a direction away from each other and longitudinally of the wire.

11. A wire-stripping device, comprising a pair of pivoted clamping jaws, a pair of pivoted cutting and stripping jaws, and means for effecting movement of one of said pairs of jaws relatively to the other in a direction longitudinally of the wire.

12. A wire-stripping device, comprising a pair of pivoted clamping jaws, a pair of pivoted cutting and stripping jaws, and means for effecting simultaneous movement of both said pairs of jaws in a direction away from each other and longitudinally of the wire.

13. A wire-stripping device, comprising a pair of pivoted clamping jaws, a pair of stripping jaws, and means for turning said clamping jaws about their pivots in a direction whereby to effect a longitudinal movement of the clamped wire relatively to the stripping jaws.

14. A wire-stripping device, comprising a pair of pivoted clamping jaws having grooved faces to receive the wire, a pair of cutting and stripping jaws having notches also to receive the wire, and means for effecting movement of one of said pairs of jaws relatively to the other in a direction longitudinally of the wire.

15. A wire-stripping device, comprising a clamping means, stripping means, means for moving the stripping means relatively to the clamping means in a direction longitudinally of the wire, and a guide for the stripping means in its longitudinal stripping movement.

16. A wire-stripping device, comprising two lever handle members pivoted together, and clamping means and stripping means connected to said handle members to be actuated by them whereby one of said means will be moved relatively to the other in a direction longitudinally of the wire.

17. A wire-stripping device, comprising two lever handle members pivoted together, and clamping means and stripping means connected to said handle members to be actuated by them whereby the stripping means will be moved relatively to the clamping means in a direction longitudinally of the wire.

18. A wire-stripping device, comprising two lever handle members pivoted together at a point between their ends, clamping jaws carried by said members at one side of their pivot, and stripping jaws having operative connection with said members at the opposite side of their pivot whereby said members will operate the clamping jaws and stripping jaws and effect a movement of one pair of jaws relatively to the other in a direction longitudinally of the wire.

19. A wire-stripping device, comprising two lever handle members pivoted together at a point between their ends, clamping jaws carried by said members at one side of their pivot, and stripping jaws having operative connection with said members at the opposite side of their pivot whereby said members will operate the clamping jaws and stripping jaws and effect a movement of the stripping jaws relatively to the clamping jaws in a direction longitudinally of the wire.

20. A wire-stripping device, comprising two lever handle members pivoted together at a point between their ends, clamping jaws carried by said members at one side of their pivot, combined cutting and stripping jaws having operative connection with said members at the opposite side of their pivot whereby said members will operate the clamping jaws and stripping jaws and effect a movement of the stripping jaws relatively to the clamping jaws in a direction longitudinally of the wire, and a guide for the stripping jaws in their longitudinal stripping movement.

21. A wire-stripping device, comprising two lever handle members pivoted together, and clamping means and stripping means connected to said handle members to be actuated by them to successively clamp and strip the wire.

22. A wire-stripping device, comprising two lever handle members pivoted together, and clamping means and stripping means connected to said handle members to be actuated during a single movement of them to successively clamp and strip the wire.

23. A wire-stripping device, comprising clamping means, stripping means, and means for effecting movement of both said means in a direction away from each other and longitudinally of the wire.

24. A wire-stripping device, comprising a pair of clamping jaws, a pair of stripping jaws, and means for effecting movement of both pairs of jaws in a direction away from each other and longitudinally of the wire.

Signed at New York, in the county of New York, and State of New York, this 16th day of June A. D. 1915.

STUART G. WOOD.

Witnesses:
 CHAS. F. DANE,
 C. J. BUTLER.